2,874,412

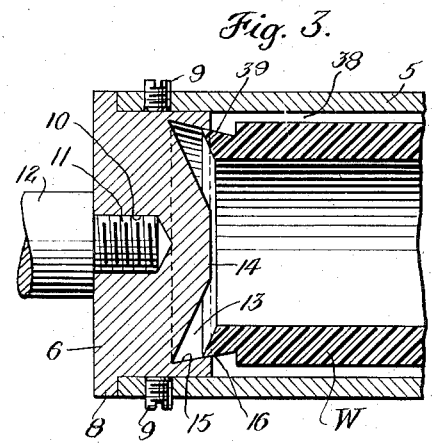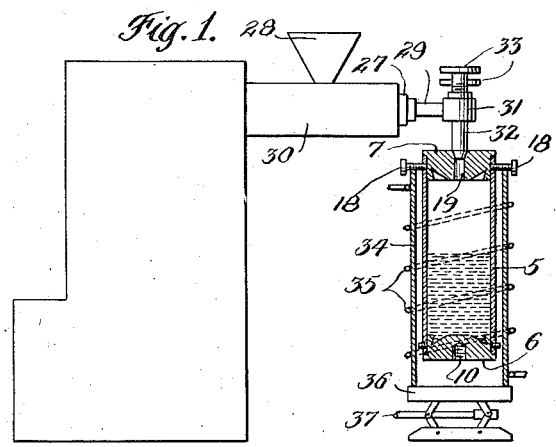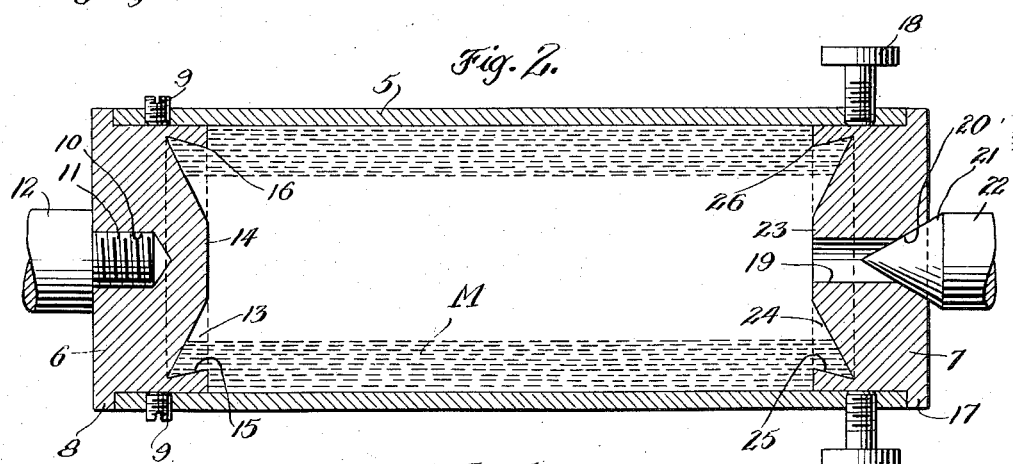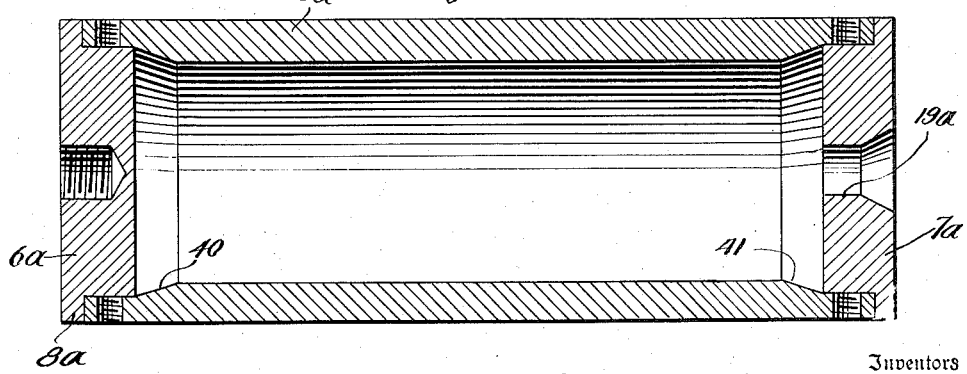
Inventors
Norbert A. Flemming
Eugene E. Montross
By Synnestvedt and Lechner
Attorneys

United States Patent Office 2,874,412
Patented Feb. 24, 1959

APPARATUS AND PROCESS FOR CENTRIFUGAL MOLDING OF ARTICLES FROM THERMOPLASTIC MATERIALS WHICH EXHIBIT SUBSTANTIAL VOLUMETRIC SHRINKAGE

Norbert A. Flemming, Reading, and Eugene E. Montross, West Wyomissing, Pa., assignors to The Polymer Corporation, Reading, Pa., a corporation of Pennsylvania Application March 2, 1953, Serial No. 339,846

3 Claims. (Cl. 18—39)

This invention relates to the manufacture of articles from molten materials, particularly thermoplastic materials, more especially the synthetic linear polyamides known to the trade as nylon, and most especially from the high melting polyamides such as polyhexamethylene adipamide, polyhexamethylene sebacamide and poly-epsilon aminocaproic acid (caprolactam). The invention is particularly concerned with improved molding apparatus and technique.

Certain of the above materials, and most especially polyhexamethylene adipamide are characterized by substantial volumetric shrinkage upon solidification. This property gives rise to a tendency toward dimensional imperfections where articles are to be formed by molding or casting processes. The invention is of particular advantage when used with materials having this characteristic and further which are characterized by a relatively high degree of fluidity in the molten condition.

It is here noted that although the present invention is especially advantageous when used with nylon material, it is to be understood that this material may be modified somewhat by the presence of certain other constituents such as pigments, fillers, anti-oxidants and other modifiers.

The present invention has as its primary object the provision of improved method and apparatus for accurately and consistently forming pieces which are uniform and symmetrical about their central axes, and is particularly useful in centrifugally casting tubular pieces, for instance, pieces having cylindrical inside and outside surfaces. Other objects of the invention include provision for production of such uniform pieces at a relatively high rate, with given equipment.

This invention is an improvement over the invention disclosed in the application of Louis L. Stott, filed June 8, 1950, Serial No. 166,790, and assigned to the assignee of the present application. The general procedure set forth in the Stott application above identified may be utilized with the improved molding apparatus and technique of the present invention. Briefly, in a typical operation, by centrifugally casting in a manner generally common with that of the above identified application, a piece having cylindrical inside and outside surfaces is formed by first preparing a charged and heated mold comprising a mold cylinder having end closure plugs, then spinning the mold about its longitudinal axis, and cooling the mold and its charge while continuing the spinning, until the temperature of both the mold and the charge are brought below the solidification point of the material being molded, whereupon the mold is opened and the solidified cylindrical piece removed.

In addition to the foregoing steps, which are common to the present application and to said prior Stott application, the present invention provides a specially formed mold for use in this centrifugal casting method, which mold, in effect, utilizes the volumetric shrinkage of the material being molded to maintain accurate centering of the piece being molded with reference to the axis of spinning of the mold. In this way provision is made for forming pieces which are highly uniform and symmetrical about their central axes, as will further appear.

How the foregoing and other objects and advantages of the invention are accomplished will appear more clearly from the following description referring to the accompanying drawing which illustrates two embodiments of the invention.

In the drawing:

Figure 1 is a vertical sectional view of a mold constructed according to the present invention, this view illustrating the mold associated with charging equipment, portions of which equipment are shown in outline only;

Figure 2 is a longitudinal sectional view of a mold such as shown in Figure 1, this view showing the mold on an enlarged scale as compared with Figure 1, and showing a charge of molten material distributed within the mold as it initially would be during the spinning thereof, and further illustrating the mold in association with equipment used for spinning;

Figure 3 is a fragmentary sectional view of the mold of Figure 2 showing the material therein distributed as it would be after completion of solidification; and Figure 4 is a longitudinal sectional view of a second embodiment of a mold of the present invention.

Although the outside shape of the piece being formed need not necessarily be cylindrical, it is pointed out that the drawing shows two embodiments of the invention for centrifugally casting pieces having cylindrical inside and outside surfaces.

In considering the drawing, it is first mentioned that the whole mold is preferably mounted so that the material therein will solidify while under the influence of centrifugal force. This mounting may be accomplished in any suitable way but it is pointed out that as illustrated in the drawing the mold is mounted for rotation about its longitudinal axis by means of two mold supports located generally axially of the mold at the ends thereof.

As illustrated in Figures 1, 2 and 3, the mold comprises a cylinder or tube 5, preferably having a nicely finished interior surface, and end plugs 6 and 7 which may be placed in the tube to substantially close the ends thereof.

Plug 6 is shouldered to provide a portion fitting within the main mold cavity and also a flange 8 adapted to abut the end wall of the tube. Fastening screws 9 may be used to hold it in proper position. Plug 6 further has a centrally located recess 10 which is threaded to receive the threaded end 11 of a rotative mold support 12. There is an annular groove 13 located on the inside face 14 of plug 6. This groove provides a cavity extension having a peripheral surface 15 which flares outwardly in a direction away from the main mold cavity; that is, surface 15 defining the side of the groove more remote from the plug rotative axis, is inclined with respect to this axis in such direction that the groove 13 undercuts the edge 16. Surface 15, if extended out of the groove, would describe a right circular cone with its axis coincident with the longitudinal mold axis and with its vertex pointing toward the opposite end of the mold tube.

Plug 7 is adapted to be inserted in the other end of the mold tube, this plug also having a portion fitting within the mold and having a flange 17 abutting the end wall of the mold. Thumb screws 18 are preferably employed to retain the plug 7 in proper position and also to serve another purpose referred to below. Plug 7 has a central aperture 19 extended therethrough, the outer portion of which is flared as indicated at 20, adapted to be engaged by the tapered end portion 21 of the support 22 for rotatively mounting the mold. The central aperture 19 and its flared portion 20 serve other purposes described below. Similarly to plug 6, the inside face 23 of plug 7 is grooved as at 24. The peripheral groove surface 25 flares outwardly in a direction away from the main mold cavity, that is, surface 25 is inclined with respect to the rotative axis in a direction to cause the groove 24 to undercut the edge 26.

The degree of inclination of the surfaces 15 and 25 with respect to the axis of rotation depends on several factors described later.

It is preferred to load or charge the mold by means of equipment such as is illustrated in Figure 1. A screw type feeder, shown in outline in Figure 1, may comprise a feed screw (not shown) within a casing 27 having a feed hopper 28 and a delivery pipe 29. The screw and its casing are preferably surrounded by a heating jacket or the like, indicated in outline at 30, and containing electrical or other heating means. The material is fed, preferably in flake or granular form, into the hopper 28 and is thereupon simultaneously advanced by the screw and heated by the jacket 30 so that the material is melted while being advanced. The melted material is discharged through the pipe 29, the nozzle structure 31 and one or more charging nozzles 32. Each charging nozzle has a tapered end portion the purpose of which is described below. A valve 33 is provided for each charging nozzle to regulate the flow of melted material therethrough. Heating means (not shown) may be added if necessary to the nozzle structure and/or the charging nozzles to retard cooling of the material during discharge thereof.

During charging of one of the molds, the mold tube with the end plugs assembled therewith is placed in a heating chamber 34 adapted to be heated by electrical or other heating means such as indicated at 35. The thumb screws 18 serve to support the mold by engagement with the upper end of the heating chamber 34. Chamber 34 has a bottom wall 36 supported by an adjustable jack mechanism 37, so that the entire heating chamber with the mold therein may be raised and lowered with reference to one of the nozzles 32.

As shown in Figure 1, when the heating chamber 34 with the mold therein is raised, the tapered end portion of one of the charging nozzles enters and fits the flared outer portion 20 of the aperture 19 in the plug 7.

Briefly, the preferred sequence of operations in molding a piece with the mold of the present invention is as follows:

First, the end plugs and mold tube are assembled and this assembly may then be preheated, for instance by insertion in a heating chamber or furnace, or by immersion in a heating bath. Although the temperature of preheat may vary, it is preferable that the mold assembly be brought to a temperature appreciably above the melting point of the material to be used. Thus, in the case of polyhexamethylene adipamide, the mold assembly should be brought to a temperature upwards of about 507° F. (the melting point of the adipamide), the temperature being in the range from about 515° F. to about 550° F., and preferably between 520° F. and 535° F. for the larger sizes of 3" O. D. and over, and somewhat higher for the smaller sizes.

The mold may, if desired, be flushed prior to charging with an inert gas, such as nitrogen, through the apertured end plug. The assembly is then placed in a heating chamber such as is shown at 34 in Figure 1, wherein the mold may be maintained at whatever temperature is necessary. The heating chamber 34, with the mold therein, is raised to bring one of the nozzles 32 into the aperture in the end plug. The appropriate valve 33 is then opened and melted material is delivered into the mold until the desired volume of charge is reached. In the embodiment here being described, since the piece to be formed is cylindrical and will occupy only a fraction of the total volume of the mold, the charge will, of course, be substantially less in volume than the total volume of the mold cavity.

After charging the mold is removed from association with the charging nozzle and heating chamber and promptly associated with the mold spinning equipment, including rotative supports such as shown at 12 and 22 in Figure 2. The tapered end portion 21 of the support 22 now serves not only to support the mold for spinning but also to close the filling aperture and thereby prevent ingress of air and egress of molten material. The mold is advantageously rotatively driven through the support 12. During the spinning the molten material is distributed into the form of a cylinder, for instance as illustrated at M in Figure 2. The mold and the charge therein are now cooled, for instance by contact of the air with the outside surface of the mold, while the spinning continues, the temperature being taken down below the solidification point of the material being molded. The cooling action may be augmented by directing a stream of coolant, such as air or water onto the outer surface of the mold. As solidification progresses volumetric shrinkage occurs so that the solidified piece, for instance as illustrated at W in Figure 3, is smaller than the mold cavity.

The spinning operation should be effected at relatively high rotational speeds, although the speeds may be varied somewhat depending upon the diameter and wall thickness of the pieces being formed. In general, higher speeds should be utilized for parts of smaller diameter. In a typical case in which a cylinder of ¾" wall thickness and 4" outside diameter is being formed of polyhexamethylene adipamide, the spinning speed should preferably be of the order of about 1800 R. P. M.

For cylindrical pieces of various sizes the mold may be spun either on a horizontal axis or on a vertical axis, although for large diameter pieces, especially where the wall thickness is relatively great, spinning on a horizontal axis is preferred.

It may be mentioned in connection with the charging and heating that for certain purposes, particularly in the formation of relatively small pieces, the material in unmelted form (as for instance in flakes or granules) may be charged directly into the mold, in which case the apertured end plug (e. g., 7 in Figure 2) is removed during charging. In fact this apertured plug may be replaced by a plug having a recess not extending through the plug adapted to cooperate with the tapered mold support 22. The mold, after being charged with unmelted material, is closed and then heated, as for instance by immersion in a heating bath, to melt the charge.

Before discussing the intended functioning of various parts of the invention, attention is called to an analysis of the several problems which are thereby encountered and overcome. Although pieces made by an ordinary cylindrical centrifugal mold are perfectly satisfactory for some purposes, difficulty is encountered in producing pieces characterized by an extremely high degree of dimensional accuracy and uniformity. In general it may be said that because of the substantial volumetric shrinkage of certain materials upon solidification, when an ordinary cylindrical centrifugal mold is used there is a tendency for some of the finished pieces to be imperfect in one or more of the following three ways:

(1) The surface of the bore may lack exact concentricity with the outside surface of the piece. This effect occurs when during the cooling, the outer layer of material which hardens first remains in contact with the mold at one side while shrinking out of contact at the other side. Since the inner mass of material is still molten, centrifugal force will hold the mass in a position concentric with the axis of rotation. Thus, upon completion of solidification, the bore which will be concentric with the rotative axis, will not be concentric with the outer surface of the molded piece since the outer surface will have solidified tight against one side of the mold and free from the opposite side of the mold. This undesirable condition will be more pronounced when it occurs in a casting having a relatively large diameter or a casting having relatively thick walls.

(2) A second imperfection sometimes occurs, that is, the molded piece may bow or bend longitudinally. The cause of this defect is not precisely known. It may result from the use of unbalanced molds. It may also result from the material remaining in contact with the mold walls unevenly. Thus, if the material during spinning, solidification and shrinkage, remained against one side of the mold at both ends of the mold while contacting the opposite side of the mold at the middle (longitudinally), then the resultant casting would not be straight sided.

(3) A third defect sometimes occurs, that is, the casting is elliptical rather than circular in cross section. Here again, the precise cause of this imperfection is not known.

The present invention virtually eliminates the above three defects and makes possible the rapid and accurate molding of cylindrical pieces which are straight, of circular cross section and have concentric inner and outer surfaces. This is accomplished by a mold which places the piece in stress longitudinally as it solidifies and at the same time keeps the piece exactly concentric with the rotative axis. When the mold cavity extensions at the ends of the mold have peripheral surfaces which are inclined as shown and when the material being molded undergoes reduction in volume upon solidification, then this longitudinal stress is a tension stress. To provide for this tension and concentricity the mold has a main cavity which molds the main body of the piece and a cavity extension which molds a flared projection on either end of the piece which will hold the piece centered and tend to place it in tension as it shrinks during solidification.

In further explanation, there follows a step-by-step analysis of the cooling process:

First, a thin outer skin of hardened material forms. (Solidification will steadily continue inwardly until the whole piece is hardened.) Next this hardened skin tends to shrink away from the mold cavity walls in both directions—radially and longitudinally. The inclined or flared surface of the projection on each end will remain in contact with the corresponding inclined surface of the mold cavity extension because the radial shrinkage, which would tend to separate these two inclined surfaces, will be offset by the longitudinal shrinkage, which tends to bring the two surfaces into increasingly tighter contact. Thus, as the piece shrinks in both directions the inclined surface of the flared projection will slide over the inclined surface of the cavity extension. This action keeps the piece exactly centered on the rotative axis and tends to place the piece in tension longitudinally.

The main mold cavity serves to impart the desired exterior shape to the piece being molded and by centripetal force to contain the molten material during the solidification of a thin outer skin thereof. As the solidification continues and shrinkage becomes appreciable, the piece is suspended by its ends while the gap between the outer surface of the main body of the piece and the mold cavity surface increases. Thus the hardened outer skin of material acts as a mold sustained at its ends and contains the inner mass of material during its solidification.

The flared peripheral surface of the mold cavity extension may vary in length and angle of inclination with respect to the rotative axis. The theoretically ideal values of these two variables (length and angle of inclination) are related to each other and to the percentage of volumetric shrinkage displayed by the particular material being molded. Theoretically, for any particular material, the maximum diameter of the mold cavity extension should bear a particular relationship to the minimum diameter of said extension in order to facilitate removal of the piece. Thus, in this way, the maximum diameter (after shrinkage) of the flared projection molded onto the piece will be approximately the same as the minimum diameter of the mold cavity extension, so that the piece may be snapped out of the mold without necessitating the cutting off of the flared projection. This is clearly illustrated in Figure 3 wherein is pictured a solidified piece W molded from a material (such as polyhexamethylene adipamide) which displays a volumetric shrinkage upon solidification of approximately 16%. As seen in Figure 3, a gap 38 exists between the surface of the main mold cavity and the outside surface of the piece W. The flared projection 39 is just barely still in contact with the edge 16 of the mold cavity extension 13. The interengagement of the conical flared surfaces of piece W and mold cavity 13 has served to retain the piece W exactly concentric with the rotative axis during the entire solidification and shrinkage.

If the maximum diameter of the mold cavity extension is too great with respect to the minimum diameter of said extension, then the molded piece will undercut the edge of the mold cavity extension too far for easy removal. On the other hand, if this maximum diameter is too small with relation to the minimum diameter, then the shrinkage will cause disengagement of the molded piece from the cavity extension before all of the inner mass of material is solidified in exact concentricity with the rotative axis. However, given a proper relationship between the maximum and minimum diameters, the angle of inclination and length of the inclined surface may be varied to suit operational convenience so long as this proper diametral relationship is maintained and it is not always necessary to adhere strictly to the theoretically ideal values. Thus, if the length of the inclined surface is increased, the diametral relationship can be held constant by decreasing the angle between the inclined surface and the rotative axis. Conversely, a decrease in length can be compensated for by an increase in angle of inclination. When working with polyhexamethylene adipamide we have found that a flared section ½" long (measured along the rotative axis) inclined at an angle of 10° is satisfactory for outside piece diameters of from 1½ to 4" and length of from 22" to 26". If the angle is increased by approximately 3° for every inch increase in diameter above 4", satisfactory results are obtained.

Turning next to the embodiment of the invention shown in Figure 4, it is observed that the general shape and function of the mold are the same. The mold tube 5a has somewhat thicker walls than mold tube 5 but the end plugs 6a and 7a are somewhat thinner than those used with tube 5. The portion of plug 6a which extends into the mold tube is larger in diameter than the inside diameter of the main body of the mold tube. Thus, at the end of the tube interior there is an enlargement or cavity of diameter large enough to receive the plug and long enough to permit entry of the plug until flange 8a is seated on the end wall of the tube. The edge of the mold interior surface which is adjacent to the inside plug face is chamfered at each end as at 40 and 41. This provides a tapered cavity at each end having inclined surfaces which will serve to mold an annular radial projection onto the end of the molded piece. The plug 7a which is adapted to be inserted in the other end of the mold tube is constructed similarly to plug 6a except that the threaded recess is replaced by a central aperture 19a as described above in connection with plug 7.

The angle of inclination and length of surfaces 40 and 41 may be varied in the manner described in connection with the embodiment shown in Figures 1, 2 and 3.

It is here noted that the plugs may advantageously be formed of a metal having a higher coefficient of thermal expansion than the metal of which the mold tube is formed. For instance the mold tube may be formed of steel and the plugs of bronze. The plugs are also preferably carefully machined and finished to a size snugly fitting the end portions of the mold tube when the tube and plugs are at about room temperature. This facilitates insertion and removal of the plugs for the purpose of cleaning the mold tube and also for the purpose of removing cylindrical pieces formed therein. On the other hand, when the tube and plugs are heated up to relatively high temperature, the close fit of the plugs and the difference between coefficients of expansion of the tube and plugs causes the plugs to very tightly close the ends of the mold tube.

We claim:

1. A centrifugal mold for molding a tubular article from molten material characterized by substantial volumetric shrinkage upon solidification, said mold comprising a mold tube and end closure plugs therefor, each of said plugs having an annular groove in the inside face, said groove having an undercut peripheral surface which is flared outwardly in a direction away from the interior of the mold tube.

2. A centrifugal mold according to claim 1 in which said undercut peripheral surface of the groove is in the form of a right conical frustum with the smaller base in communication with the main cavity, the relationship between the base diameters of said frustum being such that after solidification and shrinkage the material therein has a maximum diameter approximately equal to the diameter of said smaller base to thereby ease removal of the piece being molded from said groove.

3. A method for centrifugally molding tubular articles from molten material characterized by substantial volumetric shrinkage upon solidification comprising, rotating a centrifugal mold about its central axis to centrifugally distribute the material, cooling the mold to solidify a thin layer of the distributed material in contact with the peripheral wall of the mold, continuing the cooling to thicken said thin layer of solidified material, during which cooling the thickening solidified layer shrinks away from the mold wall, supporting the thus partially solidified article at its ends by applying circumferentially uniformly distributed radial forces thereto and thereby maintaining the peripheral surface of the article concentric with the axis of rotation, and continuing the cooling of the material and the rotation thereof in the mold while so supported until the article is completely solidified.

References Cited in the file of this patent

UNITED STATES PATENTS

| | | |
|---|---|---|
| 1,642,199 | Gollnick et al. | Sept. 13, 1927 |
| 1,678,633 | Burchartz | July 31, 1928 |
| 2,349,549 | Hardman et al. | May 23, 1944 |
| 2,462,821 | Wellman | Feb. 22, 1949 |
| 2,518,504 | Stott | Aug. 15, 1950 |